United States Patent [19]

Lamy

[11] 4,138,853
[45] Feb. 13, 1979

[54] DEVICE FOR POSITIONING A SUBMERGED PIPELINE

[75] Inventor: Jacques E. Lamy, Fontenay-aux-Roses, France

[73] Assignee: Compagnie Generale pour les Developpements Operationnels des Richesses Sous-Marines "C.G. Doris", Paris, France

[21] Appl. No.: 839,194

[22] Filed: Oct. 3, 1977

[30] Foreign Application Priority Data

Oct. 1, 1976 [FR] France .............................. 76 29577

[51] Int. Cl.² ............................................. F16L 1/00
[52] U.S. Cl. ................................... 405/171; 405/172
[58] Field of Search ................. 61/105, 107, 109, 112, 61/113; 248/54 R

[56] References Cited

U.S. PATENT DOCUMENTS

| | | | |
|---|---|---|---|
| 3,173,271 | 3/1965 | Wittgenstein | 61/112 |
| 3,903,704 | 9/1975 | Spiridinov | 61/113 |
| 4,011,729 | 3/1977 | Kermel | 61/112 |

Primary Examiner—Jacob Shapiro
Attorney, Agent, or Firm—Neil F. Markva

[57] ABSTRACT

A device for positioning a pipeline intended to rest on the bottom of the sea or of a body of water. In order to present a resistance to the drifting of the pipeline by the action of cross-currents, the pipeline is provided with a plurality of support members suitably distributed along the pipeline and extending in a direction generally parallel to the vertical plane containing the longitudinal axis of the pipeline. The support members project below the pipeline towards the bottom and are deformable in the vertical plane by the reaction of the bottom on the support members, but are transversely rigid.

27 Claims, 10 Drawing Figures

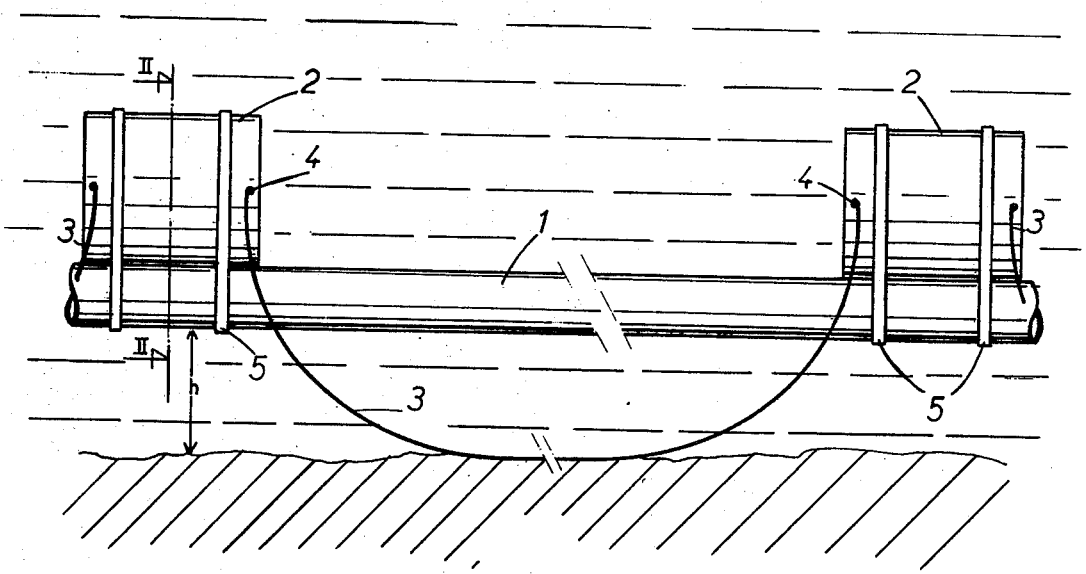
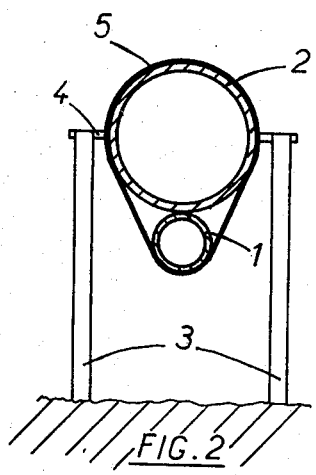
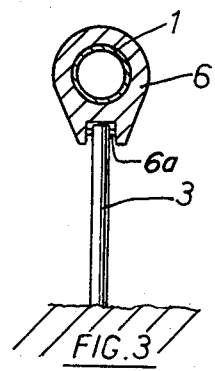
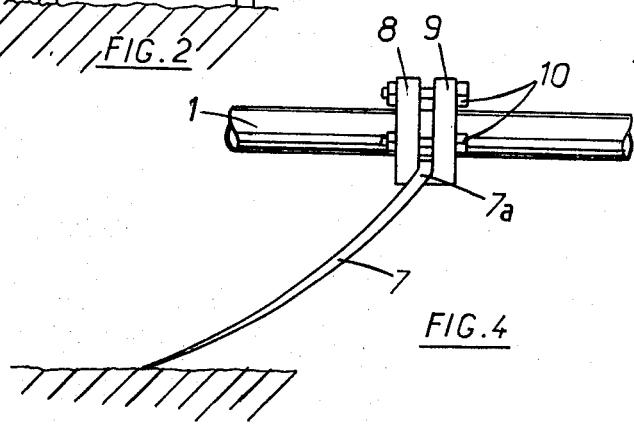
FIG. 2
FIG. 3
FIG. 4

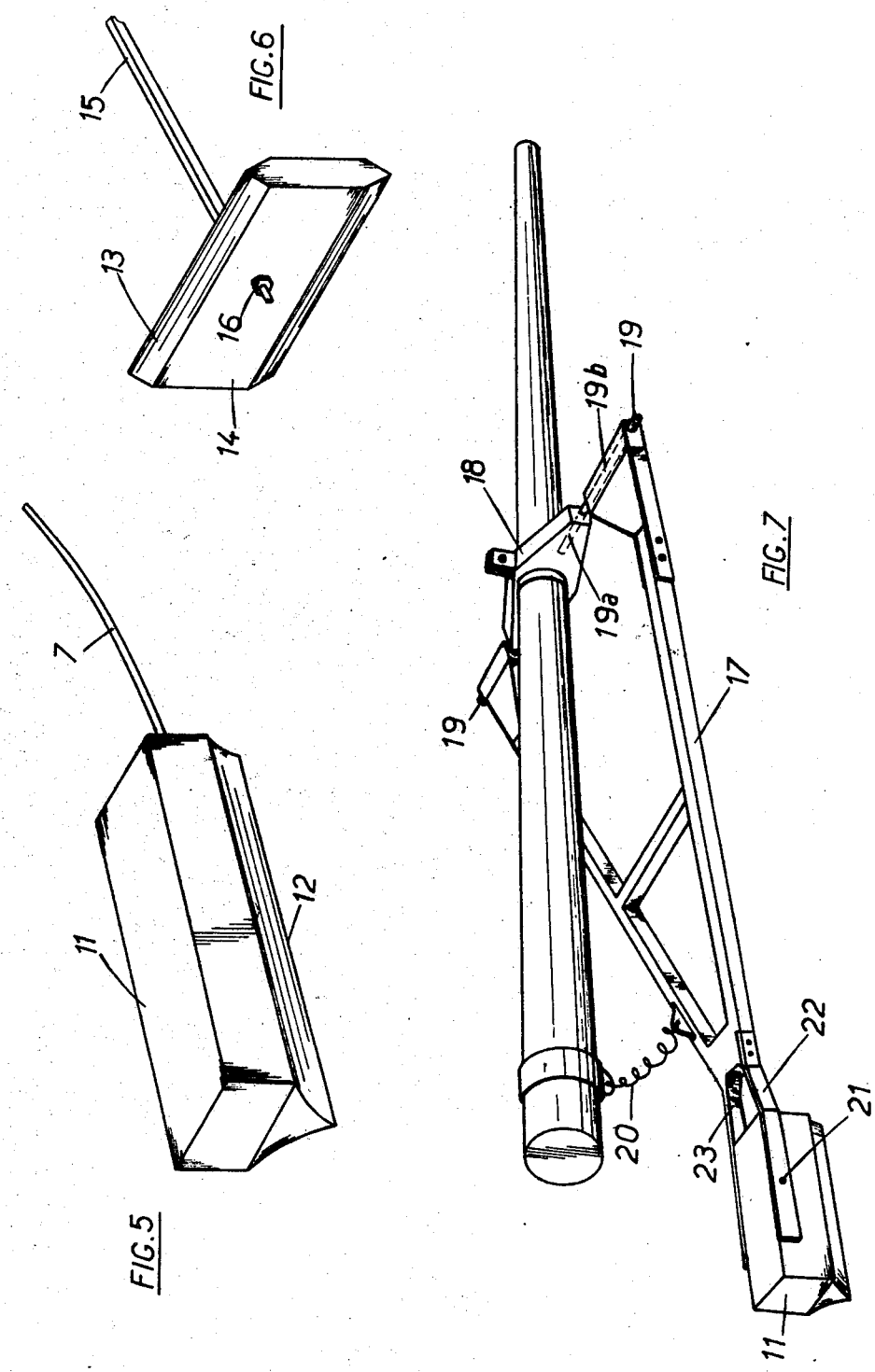

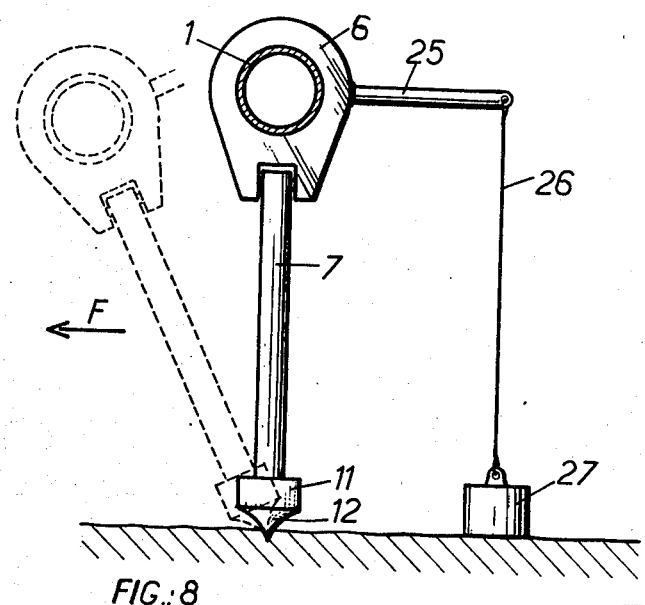
FIG.:8
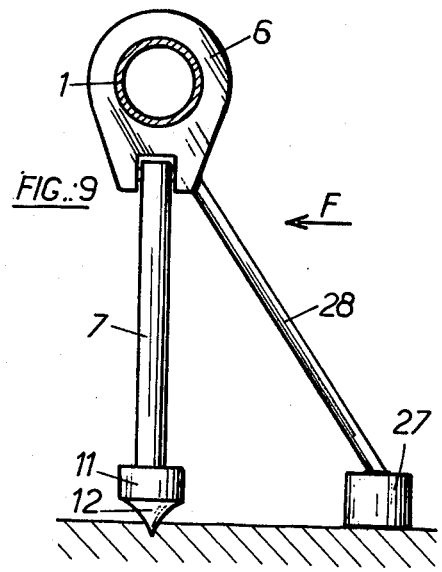
FIG.:9
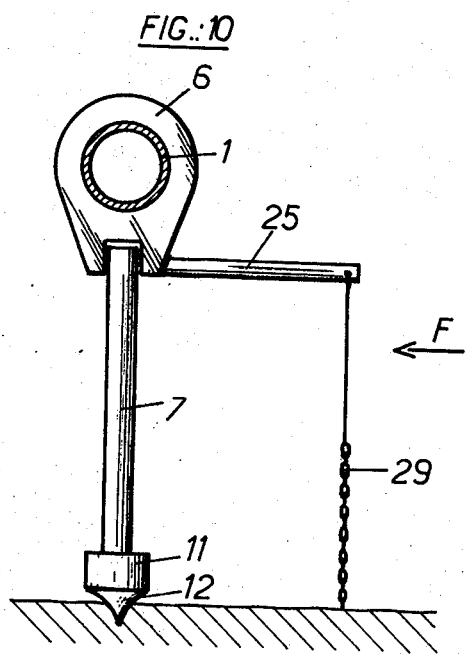
FIG.:10

DEVICE FOR POSITIONING A SUBMERGED PIPELINE

BACKGROUND OF THE INVENTION

For the positioning of pipelines intended to be submerged at the bottom of the sea, it has already been proposed to furnish these pipes, these being in themselves floatable or being so with the help of floats, with heavy chains distributed at different points. The chains impart a negative buoyancy the pipeline when it is away from the bottom. These chains act as guide ropes by arresting the descent of the pipeline from the moment where the more or less heavier part of the chains comes to rest on the sea bottom.

In this way, the stabilization of the pipeline can be achieved at a certain height above the bottom, thus facilitating certain positioning procedures. These procedures are used whether the pipeline is towed from its place of manufacture to where it is to be positioned, or whether the pipeline is submerged progressively from a barge which moves over the positioning path and on which the sections of the pipeline are progressively assembled. The problem in this latter case is to reduce the sagging of the chain when it arrives at the bottom.

Even by dragging on the bottom, the chains present only feeble resistance to the drifting of the pipeline caused by cross-currents.

The object of this invention is to provide means of arriving at similar results to those provided by chains, but which has the further advantage of permitting the counteracting of lateral displacements of the pipeline by the action of currents.

SUMMARY OF THE INVENTION

In accordance with the invention, the pipeline is fitted with support members at suitably distributed points. The support members project below the pipeline towards the bottom and are deformable in the vertical plane containing the axis of the pipeline when they meet the bottom. However possess a certain rigidity at right-angles to this plane.

BRIEF DESCRIPTION OF DRAWINGS

Various embodiments of the invention, given as examples, will be described in the following with the aid of the attached drawings.

FIG. 1 is a schematic side elevation, not to scale, representing a part of a pipeline with one of the springs with which it is fitted;

FIG. 2 is a section along the line II—II of FIG. 1;

FIG. 3 is a section, similar to FIG. 2, of a second embodiment of the invention;

FIG. 4 is a side elevation showing a third embodiment of the invention employing a spring of the semi-cantilever type;

FIG. 5 is a perspective view showing a spring combined with a heavy mass furnished with a ploughshare;

FIG. 6 shows, in perspective, a detail of an additional device;

FIG. 7 shows, in perspective, a fourth embodiment of the invention; and

FIGS. 8 to 10 are cross-section showing various methods of making a device serving to return the pipeline, with its supporting members, to a vertical position.

DESCRIPTION OF SPECIFIC EMBODIMENTS

In the embodiment shown in FIG. 1, the pipeline 1 is fitted at different places with floats 2 attached to it and imparting a positive buoyancy to the pipeline.

Also, at intervals, leaf springs 3 are attached to the pipeline 1. Springs 3 have a length sufficient to form arcs beneath pipeline 1 directed towards the bottom. Deflection of springs 3 corresponds to the height h at which pipeline 1 is desired to be kept above the bottom.

In the example shown in FIG. 1, the ends of springs 3 are attached to floats 2 by means of pivots 4, as shown in FIG. 2. Alternatively, pivots 4 can be at opposite ends of each spring 3 on the same float, if the float is long enough.

The weight of leaf springs 3 is effective to provide negative buoyancy to the assembly comprising the pipeline, floats and springs. Under these conditions, the assembly tends to sink to the bottom when released in the water.

When springs 3 touch the bottom, as shown in FIG. 1, they assume a more or less flat shape in their central portion which is in contact with the bottom. Springs 3 flex resiliently, thus generating an upwardly directed force on pipeline 1. Consequently, pipeline 1 is kept a spaced distance from the bottom. Furthermore, the structure and function of springs 3 allows pipeline 1 to be towed. A towing tug may follow the required path of positioning of the pipeline without there being excessive friction on the bottom.

As springs 3 have a certain transverse rigidity, their friction on the bottom opposes drifting due to cross-currents. Springs 3 may include a vertical part in their central portion to bite into the ground in the manner of a ploughshare.

Springs 3 are attached to floats 2 with a symmetrical distribution on both sides of the vertical plane passing through the axis of pipeline 1 (FIG. 2). This attachment offers the advantage of permitting the simultaneous detachment of floats 2 and springs 3 from pipeline 1 when it is required that pipeline 1 rests on the bottom. Bands 5 connect floats 2 and pipeline 1 as shown and can be disengaged from a distance by any suitable mechanical, electro-mechanical, or pyrotechnical means. Thus, the simultaneous detachment may be readily effected.

Springs 3 may also be attached at other points of pipeline 1. As shown in FIG. 3, collars 6 are distributed along pipeline 1 at suitable intervals. Springs 3 are pivotally connected on shafts 6a as shown.

The presence of floats is not essential with the invention. Even if pipeline 1 by itself has negative buoyancy, the presence of springs 3 keeps it at a distance from the bottom. Nevertheless, the arrangement of floats 2 located above pipeline 1, as in FIGS. 1 and 2, has the effect of raising the center of hydrostatic thrust. The float arrangement imparts a certain stability with springs 3 directed downwardly while the system is being submerged and sinking to the bottom.

FIG. 4 shows a variation in which springs 7 have a cantilever shape instead of being arc-shaped leaves. Springs 7 are attached to pipeline 1 by one end 7a only. End 7a is clamped between two collars 8 and 9 furnished with tightening members 10.

A heavy mass may be combined with springs 7, or in certain cases, between them. Such a heavy mass may be furnished with a ploughshare which engages the bottom to enhance the anti-drift action. FIG. 5 shows such a device in a modification of the embodiment according to FIG. 4. A parallelopipedic mass 11 of cement or steel is attached at the free end of leaf spring 7. Mass 11 has a tapered lower face to form a sharp edge 12 which acts as a plough.

A supplementary plough 13, cut on a plate 14, may be obliquely mounted on the end of a rod 15 attaching this plate to the mass 11 (FIG. 6). When plate 14 is engaged with the bottom and positioned obliquely in relation to the direction of advance of the pipeline, it creates a sideways reaction able to counteract a cross-current. With fixing screw 16 loosened, plate 14 may be turned through 180° around the axis of the rod 15 and then screw 16 is retightened. Thus, a symmetrical inclination can be imparted to plate 14 producing a transverse reaction which is the opposite of the preceding one.

FIG. 7 shows another embodiment of the invention. A frame 17 bears a heavy mass 11 with a plough of the above-described type and is articulated on two rods 19 fixed to collar 18 secured to pipeline 1. Any buoyancy of pipeline 1 tends to raise frames 17 with the masses 11. However, the weight of frames 17 and masses 11 may be effectively arranged to overcome this tendency. Thus, the pipeline is kept in the vicinity of the bottom.

The rods 19 may be torsion rods each anchored at one end 19a in collar 18 and at the other end 19b to frame 17. When the assembly is far from the bottom, rods 19 are adjusted to zero torsion when frame 17 hangs beneath pipeline 1. A small chain 20 attaches frame 17 to pipeline 1 and thereby determines its position with respect to pipeline 1. Such a small chain may also be employed in other embodiments, e.g. that of FIG. 4. In this embodiment, mass 11 is articulated at 21 between two arms 22 and 23 of frame 17, in such a way as to keep parallel to the bottom.

The various devices described may be combined with each other on a single pipeline, or also combined with the usual guide-ropes.

The embodiments described have only been given as examples and they can be modified, notably by the substitution of equivalent techniques, without departing from the scope of the invention by doing this.

If there is a cross-current, the pipeline and the supporting members with lateral rigidity which bear it, may position itself obliquely. At the same time, the buoyancy of the pipeline, the same being dependent on the floats, may not be large enough to create a sufficient recovery torque. To suppress this obliquity, which can risk prejudicing the action of the plough, the recovery torque can be increased by employing an eccentric counterweight.

FIG. 8, shows an embodiment similar to that of FIGS. 3 and 5 with a spring 7 and ploughshares 11, 12. An arm 25 is attached to collar 6 which surrounds pipeline 1. Arm 25 extends in a direction (Arrow F) upstream into the cross-current. A cable 26 carrying a weight 27 is attached to arm 25. The length of cable 26 is sufficient to have weight 27 rest on the bottom when the plane containing the axis of pipeline 1 and spring 7 is vertical as shown on the drawing. The deflection of the spring 7 is not very large and its average value is otherwise known. Thus, such regulation of the length of cable 26 is possible. Arm 25 can have a certain flexibility so as to ensure contact of weight 27 with the bottom.

Because of the cross-current, the system tends to assume an oblique direction, as shown in dotted lines in FIG. 8. Then weight 27 tends to be raised, thus creating a correction torque in the system. In the absence of a cross-current, weight 27, having a smooth lower surface, simply slides on the bottom supporting it. However, when the system rocks under the action of a cross-current, the weight of weight 27 is transferred to pipeline 1 and the ploughshare 11, 12 which tends to sink in more deeply exercising a greater anti-drift action. Greater traction force is required to drag the ploughshares ploughing the ground than to pull the weights 27 which simply slide on the bottom. Thus, the weight of the ploughshares can be reduced in such a manner that they do not operate much in the absence of cross-current, and the traction force of the pipeline is thereby reduced.

FIG. 9 shows a variation of the counterbalance system. Weights 27 have a smooth undersurface and are attached to pipeline 1. Rods 28, having a certain rigidity, are secured to collar 6 and have a length sufficient to allow the pipeline 1 to rest on the bottom supported by the springs, ploughshares and weights 27, in the absence of a cross-current. Rods 28 may have a certain elasticity related to that of the springs to ensure the vertical disposition of the plane containing the axis of the pipeline and the axis of the springs, in the absence of a cross-current.

FIG. 10 shows another variation of the counter-balance system. Here, the stabilizing weight consists of a chain 29 attached to the off-centered arm 25. Chain 29 has a length adjusted to drag on the bottom, in the absence of a cross-current. The tilting of the system under the action of a cross-current, from the direction of F, increases the weight of chain supported by the arm 25, thus creating a correcting torque.

Other arrangements will be capable of being devised. Thus, in the case of FIG. 2, the weight can be attached to the end of the pivot 4 which is facing upstream of the cross-current. A similar arrangement can be adopted in the case of FIG. 7 with the attachment of the weight to the end of one of the rods 19.

I claim:

1. A device for laying and positioning a pipeline intended to be supported at the bottom of a body of water, by towing the pipeline, said device comprising:
   (a) a plurality of support members distributed along the pipeline and extending in a direction generally parallel to the vertical plane containing the longitudinal axis of the pipeline,
   (b) said support members projecting below the pipeline towards the bottom to slide thereon and being deformable in said vertical plane by the reaction of the bottom on said members, but transversely rigid.

2. A device according to claim 1, wherein the support members are resiliently deformable.

3. A device according to claim 2 for keeping the pipeline at a predetermined height above the bottom, wherein the support members are leaf springs featuring means for attaching the ends of the leaf springs to the pipeline in such a manner that the leaf springs form arcs beneath the pipeline having a deflection equal to the said predetermined height.

4. A device according to claim 3, wherein the said means include floats, means for attaching the floats to the pipeline, and means attaching the ends of the leaf springs to the floats.

5. A device according to claim 2, wherein the support members are cantilever leaf springs including means for attaching one end of each spring to the pipeline.

6. A device according to claim 1, wherein the support members each consist of a frame, means connecting the frame to the pipeline for pivoting around a horizontal axis, a weight intended to slide on the bottom, and means for attaching the weight to the frame.

7. A device according to claim 6, wherein the said means connecting the frame to the pipeline consist of torsion rods.

8. A device according to claim 1, wherein the support members include weights furnished with ploughshares suitable for penetrating the bottom to counteract drifting of the pipeline caused by cross-currents.

9. A device according to claim 1, consisting of floats and means for attaching the floats above the pipeline, the said pipeline, the said floats, and the said support members being selected so that their assembly has negative buoyancy.

10. A device according to claim 1, wherein
the body of water presents a current flowing transversely to the pipeline, and wherein at least some of the support members each comprise lever means integral therewith, extending against the current, and a weight member depending from the lever means.

11. A device according to claim 10, wherein the weight member has a smooth under-surface for resting and sliding on the bottom.

12. A device according to claim 10, wherein the weight member is a chain adapted to drag the bottom.

13. A device according to claim 1 wherein
float means are disposed at spaced intervals along said pipeline.

14. A device according to claim 13 wherein said pipeline, by itself, has negative buoyancy.

15. A device according to claim 1 wherein
said pipeline, by itself, has buoyancy and
weight means are disposed at spaced intervals along said pipeline.

16. A device for positioning a pipeline intended to be submerged at the bottom of a body of water, said device comprising:
 (a) support means disposed on the pipeline and projecting below the pipeline toward the bottom,
 (b) said support means being resiliently deformable to bias upwardly toward the pipeline away from the bottom in a direction generally parallel to the vertical plane containing the longitudinal axis of the pipeline,
 (c) said support means being effective to maintain the pipeline at a predetermined height above the bottom, and
 (d) said support means being in a free resting reaction contact with said bottom.

17. A device according to claim 16, wherein the support means includes leaf springs.

18. A device according to claim 17, wherein
said support means includes means for attaching the ends of the leaf springs to the pipeline in such a manner that the leaf springs form arcs beneath the pipeline having a deflection equal to said predetermined height.

19. A device according to claim 18, wherein
said attaching means include floats, means for attaching the floats to the pipeline, and means attaching the ends of the leaf springs to the floats.

20. A device according to claim 16, wherein
the support means includes cantilever leaf springs including means for attaching one end of each spring to the pipeline.

21. A device according to claim 16, wherein
the support means include a frame, means connecting the frame to the pipeline for pivoting around a horizontal axis, a weight effective to be in said resting contact on the bottom, and means for attaching the weight to the frame.

22. A device according to claim 21, wherein
the frame connecting means comprises torsion rods.

23. A device according to claim 16, wherein
the support means include weights having ploughshares effective to counteract drifting of the pipeline caused by cross-currents.

24. A device according to claim 16, wherein
said pipeline with said support means has negative buoyancy.

25. A device according to claim 16, wherein
float means are disposed at spaced intervals along said pipeline.

26. A device according to claim 25 wherein
said pipeline, by itself, has negative buoyancy.

27. A device according to claim 16 wherein
said pipeline, by itself, has buoyancy and
weight means are disposed at spaced intervals along said pipeline.

* * * * *